United States Patent
Arimura et al.

(10) Patent No.: US 6,941,155 B1
(45) Date of Patent: Sep. 6, 2005

(54) PORTABLE TELEPHONE APPARATUS AND CHANGING METHOD OF ANSWERING METHOD OF THE SAME

(75) Inventors: Minoru Arimura, Fukuoka (JP); Toshiyuki Sugitani, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 584 days.

(21) Appl. No.: 09/642,784

(22) Filed: Aug. 22, 2000

(30) Foreign Application Priority Data

Aug. 23, 1999 (JP) ................................. 11-235049

(51) Int. Cl.$^7$ ............................................... H04M 1/00
(52) U.S. Cl. .................. 455/550.1; 455/347; 455/348; 379/434
(58) Field of Search ....................... 455/90, 550, 575, 455/82, 567, 347, 348, 575.1–575.4, 575.7, 455/90.2, 569.1, 343.4, 346, 550.1, 414.1, 455/349, 569.2; 379/88.11, 93.01, 93.08, 379/100.01, 100.06, 373.01, 372, 179, 88.23, 379/433.01, 433.11, 433.12, 434, 422, 428.04, 379/440, 88, 23, 98.08

(56) References Cited

U.S. PATENT DOCUMENTS 5,175,759 A * 12/1992 Metroka et al. ............... 379/58
5,448,251 A * 9/1995 Gerszberg et al. ........... 343/702
5,557,653 A * 9/1996 Paterson et al. ............... 379/58
5,987,311 A * 11/1999 Phillips ........................ 455/90
6,073,027 A * 6/2000 Norman et al. ............. 455/550
6,215,993 B1 * 4/2001 Ulveland ..................... 455/415
6,282,436 B1 * 8/2001 Crisp ........................ 455/575
6,359,984 B1 * 3/2002 Kim ....................... 379/433.02
2002/0132633 A1 * 9/2002 Johnson et al. ............. 455/550

FOREIGN PATENT DOCUMENTS

| JP | 64-80145 | 3/1989 |
| JP | 9-307610 | 11/1997 |
| JP | 10-190791 | 7/1998 |
| WO | 8-154068 | 6/1996 |

* cited by examiner

Primary Examiner—Edward F. Urban
Assistant Examiner—Charles Chow
(74) Attorney, Agent, or Firm—McDermott Will & Emery LLP

(57) ABSTRACT

A portable telephone apparatus capable of avoiding a troublesome operation for responding to an incoming call is provided. The portable telephone apparatus having a flip-lid includes a radio circuit section for transmitting or receiving a signal to/from a radio base station, a radio control circuit section for controlling the radio circuit section, and a flip-lid state detecting circuit for detecting an opening/closing state of the flip-lid. The radio control circuit section changes a responding method to an incoming call when opening the flip-lid is determined by the flip-lid state detecting circuit.

11 Claims, 5 Drawing Sheets

PORTABLE TELEPHONE APPARATUS AND CHANGING METHOD OF ANSWERING METHOD OF THE SAME

FIELD OF THE INVENTION

The present invention relates to a portable telephone apparatus using radio and a changing method of a responding method of it.

BACKGROUND OF THE INVENTION

Recently, following the widespread use of portable telephone apparatuses using radio, improvement of their operability has been required. Conventionally, this kind of portable telephone apparatus, when receiving an incoming call from a radio base station, shifts to a conversation state in response to a predetermined specific operation by an operation of the portable telephone apparatus.

The conventional portable telephone apparatus using the radio has a problem that a line is often broken during the conversation state depending on its radio communication state. For example, the communication is broken in various cases such as a case where a radio wave from a radio base station becomes weak, a case where a radio wave state becomes poor during movement of the apparatus, and a case where radio wave is weak near a boundary of the area controlled by the radio base station even during non-movement. When a signal comes again from another end of the line, the operator of the portable telephone apparatus must perform the predetermined specific operation again.

SUMMARY OF THE INVENTION

The present invention provides a portable telephone apparatus capable of avoiding troublesomeness of an incoming call response operation and a changing method of a responding method for avoiding the troublesomeness of the incoming response operation.

The portable telephone apparatus in accordance with the present invention is a portable telephone apparatus having a flip-lid, and includes a radio circuit section for transmitting and receiving a signal to/from a radio base station, a radio-control-circuit-section for controlling the radio circuit section, and a flip-lid state detecting circuit for detecting an opening/closing state of the flip-lid. When the flip-lid state detecting circuit determines that the flip-lid is opened, the radio control circuit section changes the responding method for responding to an incoming call. Thus, the portable telephone apparatus capable of avoiding troublesomeness of the incoming responding operation can be obtained.

The changing method of the responding method in accordance with the present invention is applied to the portable telephone apparatus having a flip-lid. When an opening/closing state of the flip-lid is checked and opening the flip-lid is determined, the responding method for responding to the incoming call is changed. This method avoids the troublesomeness of the incoming response operation.

DESCRIPTION OF THE PREFERRED EMBODIMENTS

Embodiments of the present invention will be described hereinafter with reference to FIG. 1 through FIG. 5.

Embodiment 1

Figure 1:
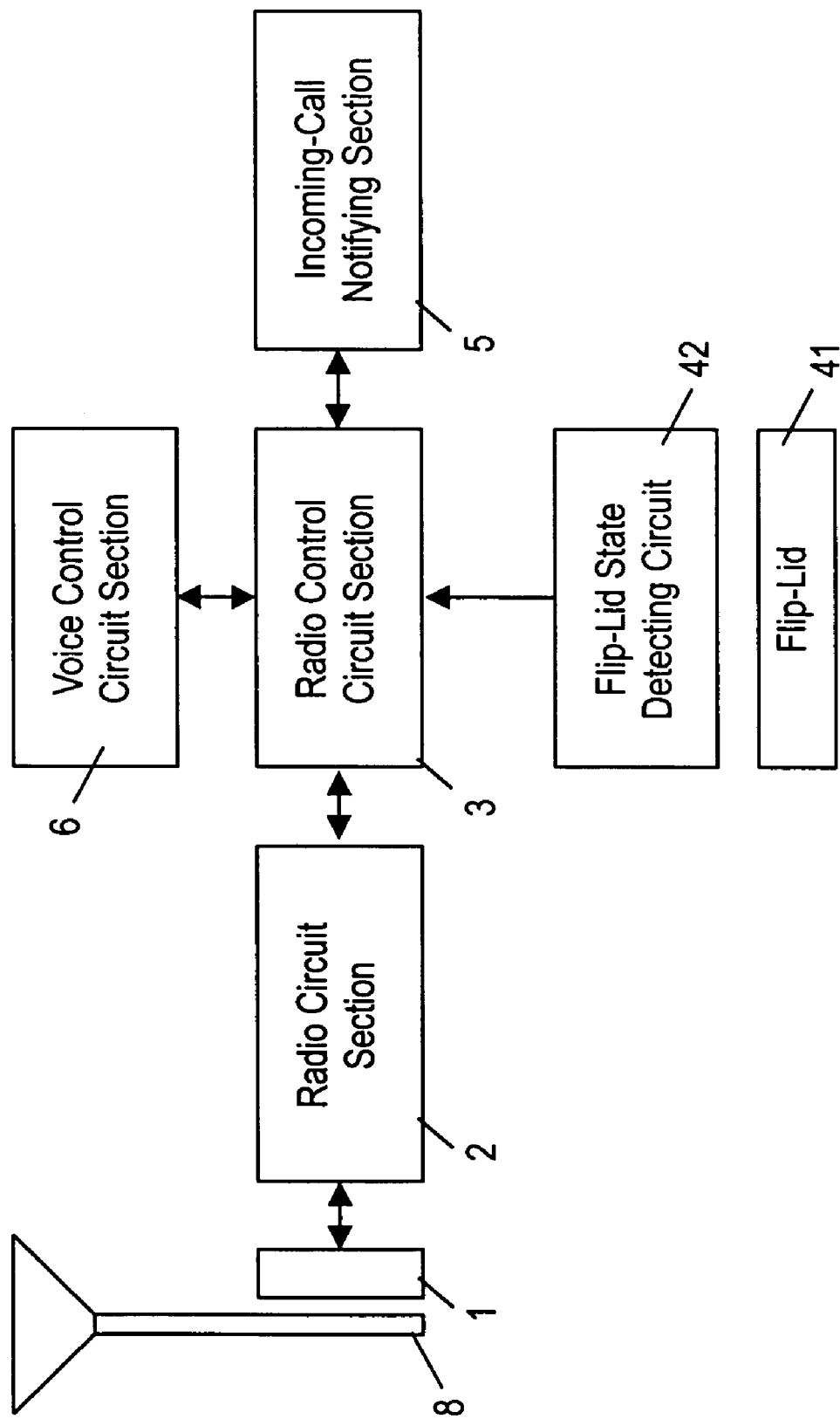
FIG. 1 is a block diagram of a portable telephone apparatus in accordance with exemplary embodiment 1 of the present invention.

FIG. 1 is a block diagram of a portable telephone apparatus in accordance with exemplary embodiment 1 of the present invention.

Antenna 8 receives and outputs a radio signal. Antenna coupling section 1 feeds the received signal from antenna 8 to another section. Radio circuit section 2 demodulates the received signal supplied from antenna coupling section 1. Radio control circuit section 3 controls the entire portable telephone apparatus. Flip-lid state detecting circuit 42 detects a state of flip-lid 41. Incoming-call notifying circuit 5 is constituted with a speaker, a ringer, a vibrator, or the like. Voice control circuit section 6 is constituted with a speaker, a microphone, an amplifier, or the like.

An operation of the portable telephone apparatus having such constitution will be described. Antenna 8 receives a radio signal from a radio base station (not illustrated). Antenna 8 supplies the received signal to radio circuit section 2 via antenna coupling section 1 formed as a flat pattern or the like. Radio circuit section 2 demodulates the received signal from antenna coupling section 1, and feeds the demodulated signal to radio control circuit section 3. Radio control circuit section 3 decodes the demodulated signal from radio circuit section 2 and determines contents of this demodulated signal. When the demodulated signal is an incoming call, after a series of processes in conformity with a protocol, radio control circuit section 3 controls incoming-call notifying circuit 5 to notify the incoming call to an operator of the portable telephone apparatus, monitors the state of flip-lid state detecting circuit 42, and recognizes opening and closing of flip-lid 41. Flip-lid state detecting circuit 42 may be a mechanical switch or an optical switch, but must have a function that can transmit the determined result whether flip-lid 41 is closing or opening to radio control circuit section 3. Radio control circuit section 3 may monitor the state of flip-lid state detecting circuit 42 at any time, or may monitor it always.

When radio control circuit section 3, during monitoring the state of flip-lid state detecting circuit 42, detects an opening state of flip-lid 41 or a shift to the opening state of flip-lid 41, radio control circuit section 3 changes the responding method relying on a predetermined specific operation such as pushing a conversation key to the responding method relying on pushing of any key. The change of the responding method may be any change which improves the operability, such as a shift from a manual response mode that requires a certain operation to an automatic response mode that does not require any operation. If the changed responding method is released using a timer for which a predetermined time is set, malfunction in the case of subconsciously opening flip-lid 41 can be avoided. Since the responding method relying on the predetermined specific operation such as the pushing of a conversation key is changed to the responding method relying on pushing of any key, the operator of the portable telephone apparatus presses on the easiest-to-press key. Therefore, radio control circuit section 3 supplies an incoming call response signal to radio circuit section 2, and starts voice control circuit section 6 to smoothly shift the telephone apparatus to a conversation state.

Thus, the operator can avoid the conventional troublesomeness of the incoming-call response operation because the responding method can be changed only by opening flip-lid 41. The telephone apparatus in accordance with this preferred embodiment does not keep the changed responding method since it has a timer for releasing the changed responding method after a set time. Therefore, an improper response to an undesired incoming call is prevented from. Since radio control circuit section 3 changes the responding method relying on pushing a predetermined specific key to the responding method relying on pushing a plurality of predetermined keys, the operator can respond to an incoming call only by pushing the easiest-to-operate key. Otherwise, when radio control circuit section 3 changes the manual response mode that requires a certain operation to the automatic response mode that does not require any operation, the operator can respond to an incoming call without performing any operation.

Preferred Embodiment 2

Figure 2:
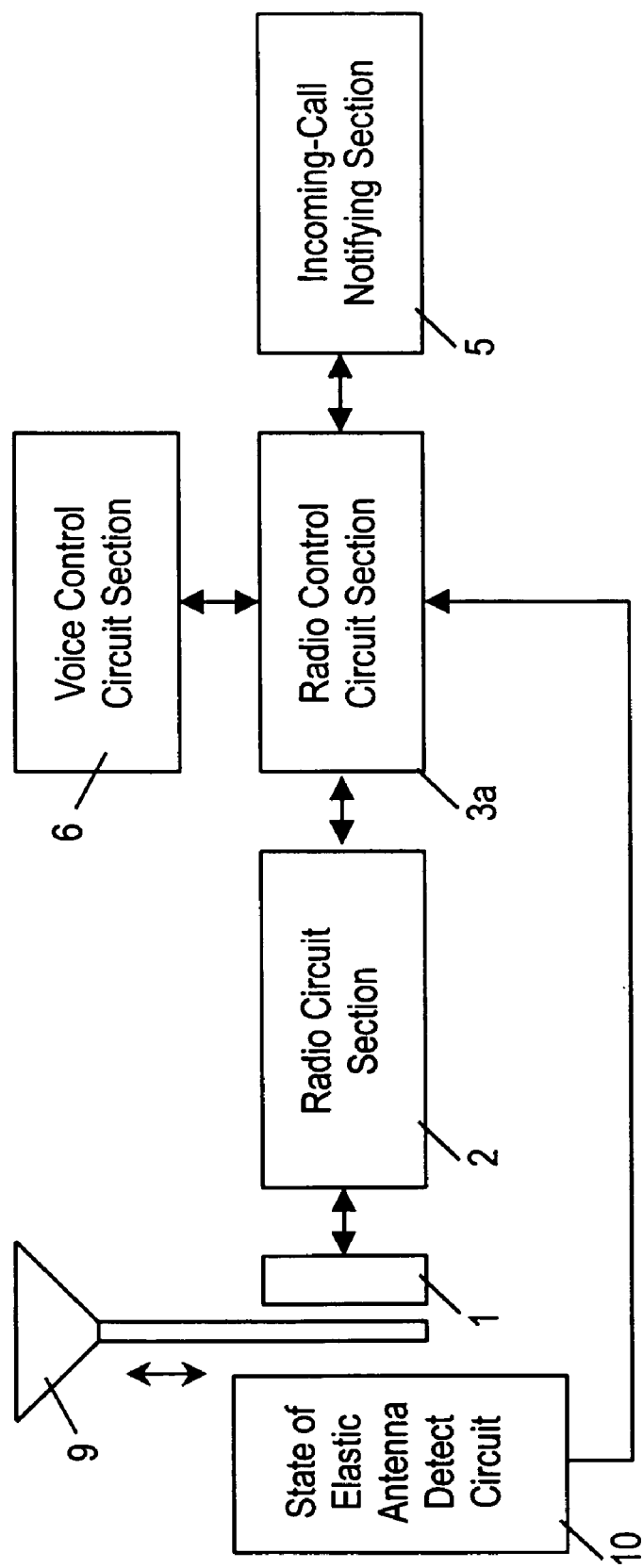
FIG. 2 is a block diagram of a portable telephone apparatus in accordance with exemplary embodiment 2 of the present invention.

FIG. 2 is a block diagram of a portable telephone apparatus in accordance with exemplary embodiment 2 of the present invention.

Antenna coupling section 1, radio circuit section 2, incoming call notifying circuit 5, and voice control circuit section 6 are the same as those in FIG. 1, and therefore are represented by the same reference numerals, and descriptions on them are omitted. Radio control circuit section 3a controls radio circuit section 2, voice control circuit section 6, and the like. Antenna 9 receives a radio signal from a radio base station, outputs it as a received signal, and is extensible so as to be freely loaded and unloaded in a case (not illustrated). Antenna extension/contraction state detecting circuit 10 detects the extension/contraction state of antenna 9.

An operation of the portable telephone apparatus having such constitution will be described. In FIG. 2, antenna 9 transmits or receives the radio signal to/from the radio base station, and is an freely-extensible antenna such as a rod antenna. Antenna extension/contraction state detecting circuit 10 detects the extending state and the contraction state of antenna 9. Antenna extension/contraction state detecting circuit 10 may be a mechanical switch or an optical switch. Radio circuit section 2 demodulates the received signal supplied from antenna coupling section 1, and modulates a signal to be supplied to antenna coupling section 1. Radio control circuit section 3a controls radio circuit section 2, decodes and encodes the demodulated signal from radio circuit section 2, and outputs it to radio circuit section 2. Radio control circuit section 3a further controls antenna extension/contraction state detecting circuit 10, incoming-call notifying circuit 5, and voice control circuit section 6. Incoming-call notifying circuit 5 notifies an incoming call to an operator of the portable telephone apparatus. Voice control circuit section 6 reproduces the signal decoded by radio control circuit section 3a, as a sound, for example, with a speaker, and supplies a voice signal to be encoded to radio control circuit section 3a, for example, with a microphone.

An incoming-call response operation of the telephone apparatus in accordance with preferred embodiment 2 is similar to that in preferred embodiment 1. Difference is only that the telephone apparatus of preferred embodiment 2 has antenna extension/contraction state detecting circuit 10 instead of flip-lid state detecting circuit 42 in embodiment 1. In other words, the operator can change the responding method to a simple method only by extending antenna 9, and the conventional troublesome of a incoming call response operation is therefore avoided.

Preferred Embodiment 3

Figure 3:
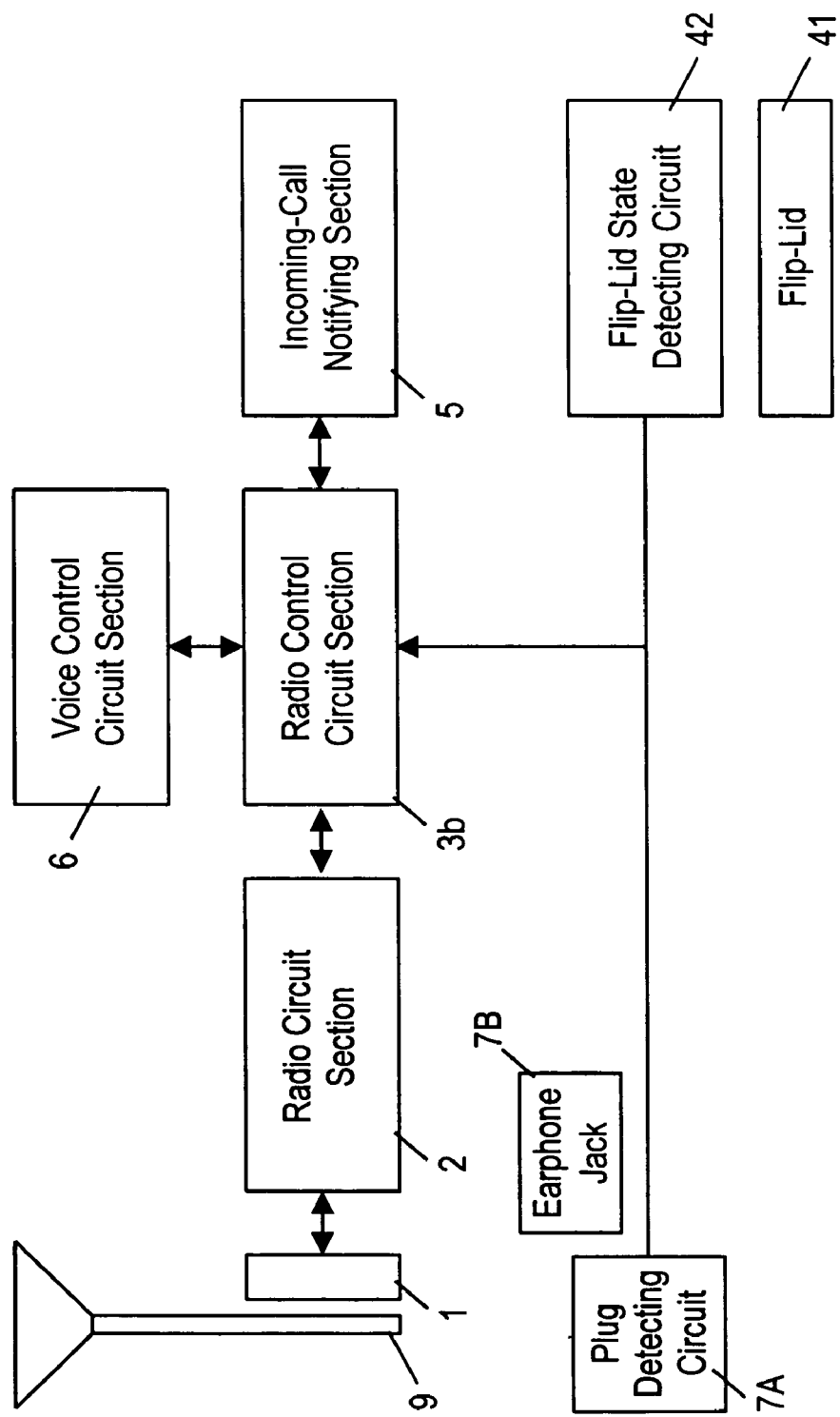
FIG. 3 is a block diagram of a portable telephone apparatus in accordance with exemplary embodiment 3 of the present invention.

FIG. 3 is a block diagram of a portable telephone apparatus in accordance with exemplary embodiment 3 of the present invention.

Antenna coupling section 1, radio circuit section 2, flip-lid state detecting circuit 42, flip-lid 41, incoming-call notifying circuit 5, voice control circuit section 6, and antenna 9 are the same as those in FIG. 1, and therefore are represented by the same reference numerals, and descriptions on them are omitted. This telephone apparatus further includes radio control circuit section 3b, earphone jack 7a, and plug detecting circuit 7b.

An operation of the portable telephone apparatus having such constitution will be described.

In FIG. 3, antenna 9 receives a radio signal and supplies the received signal to radio circuit section 2 via antenna coupling section 1. Radio circuit section 2 demodulates the received signal supplied from antenna 9, and supplies the demodulated signal to radio control circuit section 3b. Radio control circuit section 3b decodes the demodulated signal from radio circuit section 2, and determines the contents of the decoded signal. When the received signal is an incoming call, after a series of processes in conformity with a protocol, radio control circuit section 3b controls incoming-call notifying circuit 5 to notify an incoming call to an operator of the portable telephone apparatus, flip-lid state detecting circuit 42 monitors a opening/closing state of flip-lid 41, and plug detecting circuit 7b monitors whether a plug is put into earphone jack 7a or not. Flip-lid state detecting circuit 42 and plug detecting circuit 7b may be a mechanical switch or an optical switch, and have a function that transmits the opening/closing state of flip-lid 41 and the state of putting the plug into earphone jack 7a to radio control circuit section 3b. Radio control circuit section 3b may monitor flip-lid state detecting circuit 42 and plug detecting circuit 7b at any time, or may always monitor them.

When radio control circuit section 3b, during monitoring flip-lid state detecting circuit 42 and plug detecting circuit 7b, detects an opening state of flip-lid 41 or a shift to the opening state and recognizes a plug put or a shift to the plug put, radio control circuit section 3b changes a responding method relying on a predetermined specific operation such as pushing a conversation key to a responding method relying on pushing any key. This change may be any change which improves the operability, such as a shift from a manual response mode that requires a certain operation to an automatic response mode that requires no operation.

When the changed responding method is released using a timer for which a certain time is set, malfunction in the case of subconsciously opening flip-lid 41 can be avoided. Since the responding method relying on a predetermined specific operation such as pushing the conversation key is changed to the responding method relying on pushing any key, the operator of the portable telephone apparatus presses on the easiest-to-press key. Therefore, radio control circuit section 3b supplies an incoming-call response signal to radio circuit section 2, and starts voice control circuit section 6 to smoothly shift the telephone apparatus to the conversation state.

Thus, in the preferred embodiment, the operator can change the responding method to a simple method only by opening flip-lid 41 and putting the plug into earphone jack 7a, and can avoid the conventional troublesome incoming call response operation.

Preferred Embodiment 4

Figure 4:
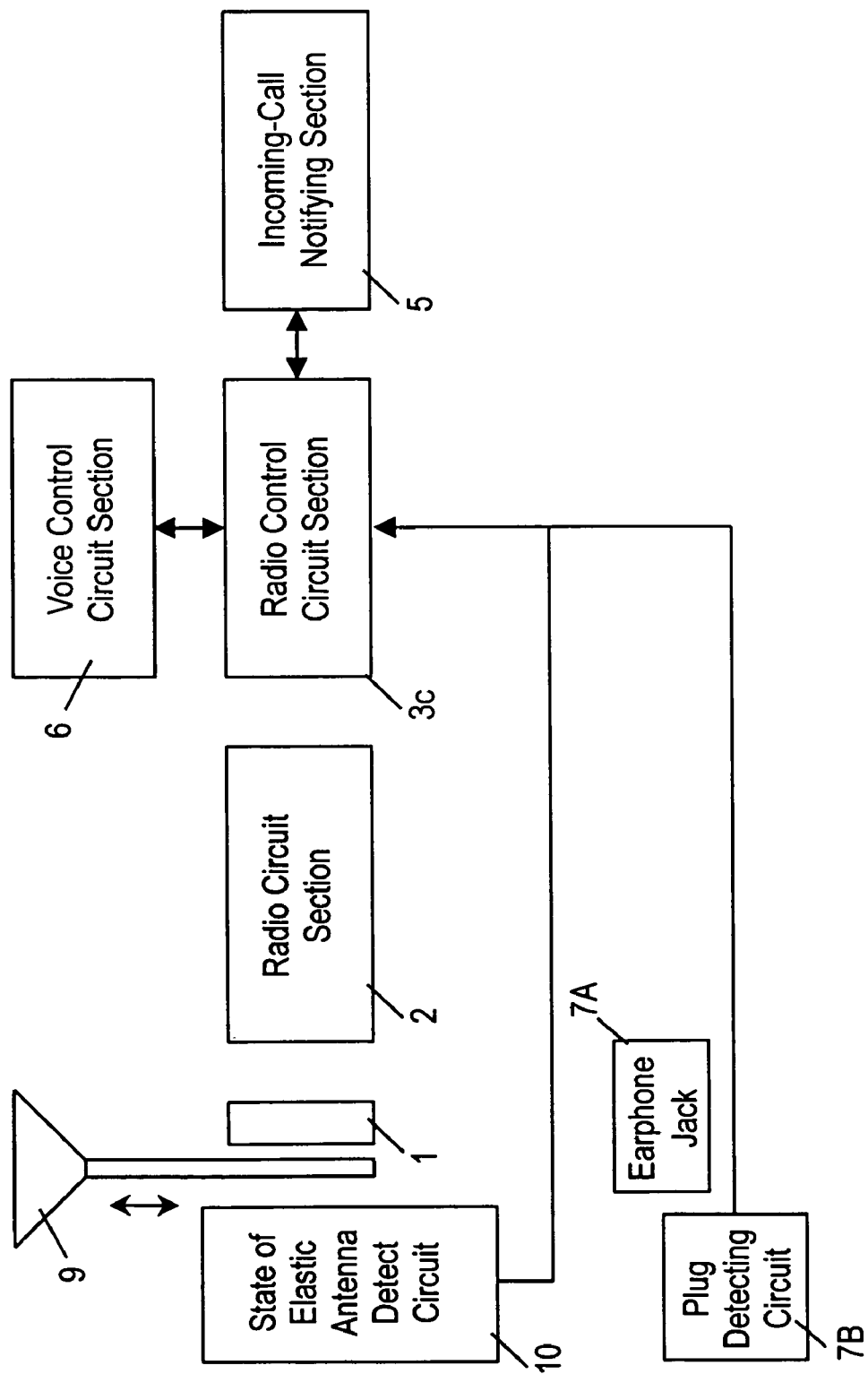
FIG. 4 is a block diagram of a portable telephone apparatus in accordance with exemplary embodiment 4 of the present invention.

FIG. 4 is a block diagram of a portable telephone apparatus in accordance with exemplary embodiment 4 of the present invention.

In FIG. 4, antenna coupling section 1, radio circuit section 2, incoming call notifying circuit 5, voice control circuit section 6, earphone jack 7a, plug detecting circuit 7b, antenna 9, and antenna extension/contraction state detecting circuit 10 are the same as those in FIG. 2 and FIG. 3, and therefore are represented by the same reference numerals, and descriptions on them are omitted. This telephone apparatus further includes radio control circuit section 3c.

An operation of the portable telephone apparatus having such constitution will be described.

In FIG. 4, radio circuit section 2 demodulates a received signal supplied from antenna coupling section 1 and modulates a signal and supplies a radio signal to antenna coupling section 1. Radio control circuit section 3c controls radio circuit section 2, decodes and encodes a signal to/from radio circuit section 2, and controls antenna extension/contraction state detecting circuit 10, signal-incoming notifying circuit 5, and voice control circuit section 6. Incoming-call notifying circuit 5 notifies an incoming-call to an operator of the portable telephone apparatus. Voice control circuit section 6 reproduces the signal demodulated by radio control circuit section 3c as a sound, for example, with a speaker, and supplies a voice signal to be encoded to radio control circuit section 3c, for example, with a microphone. Plug detecting circuit 7b detects whether a plug is put into earphone jack 7a or not. Plug detecting circuit 7b has a function that transmits a signal related to the put plug to radio control circuit section 3c. For detecting the plug, an electrical switch employing a transistor or the like is usually used. A mechanical, optical, or the other electric switch may be also used.

An incoming call response operation of the telephone apparatus in accordance with preferred embodiment 4 is similar to that described in preferred embodiment 3. The telephone apparatus of preferred embodiment 4 includes extensible antenna 9, antenna extension/contraction state detecting circuit 10, earphone jack 7a, and plug detecting circuit 7b. Therefore, radio control circuit section 3c can change a responding method for responding an incoming call when it is determined that antenna 9 is extended and the plug is put. The operator can thus change the responding method to a simple method by extending antenna 9 and putting the plug to earphone jack 7a, and can avoid the conventional troublesome incoming-call response operation.

Preferred Embodiment 5

Figure 5:
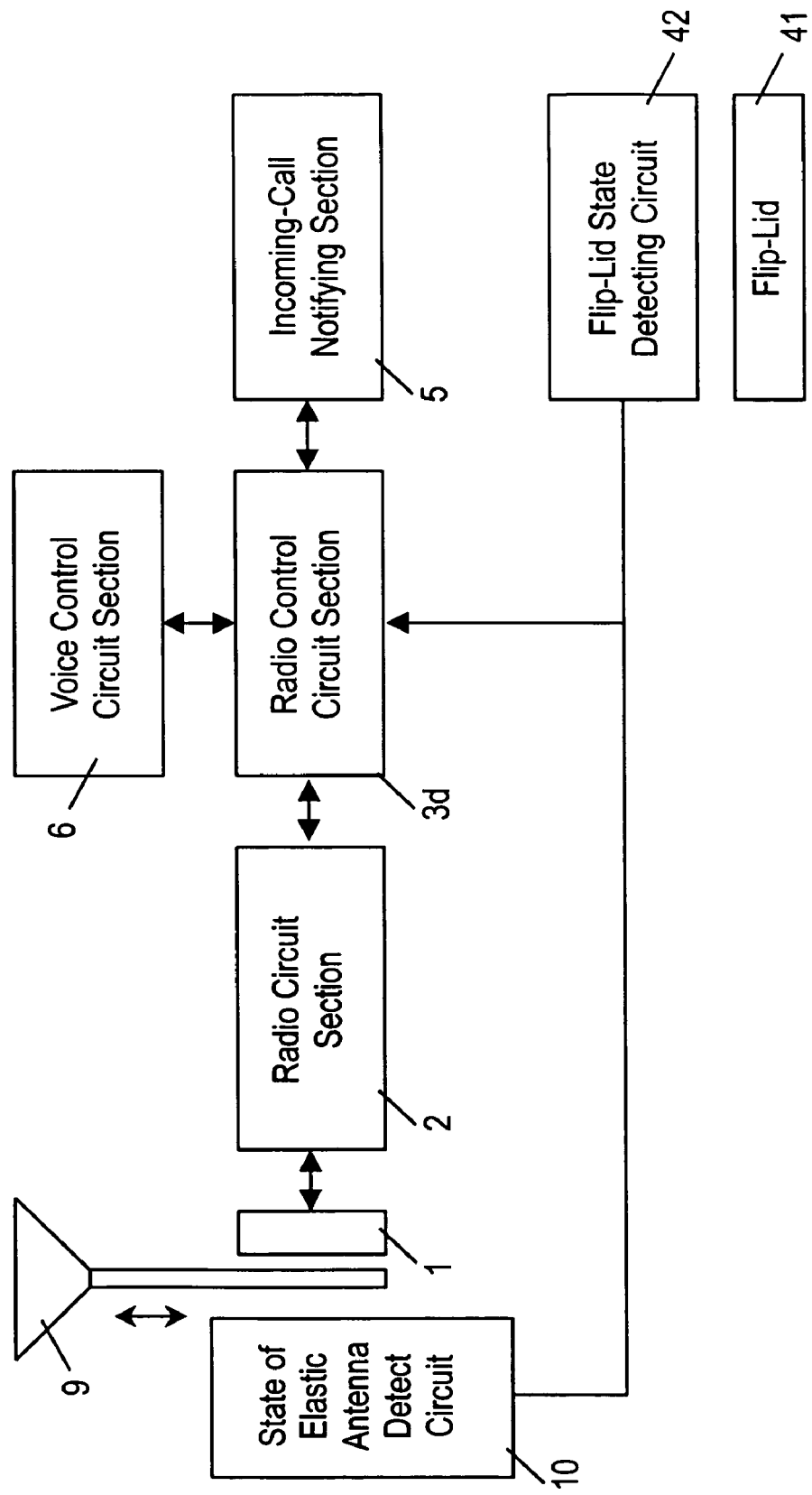
FIG. 5 is a block diagram of a portable telephone apparatus in accordance with exemplary embodiment 5 of the present invention.

FIG. 5 is a block diagram of a portable telephone apparatus in accordance with exemplary embodiment 5 of the present invention.

In FIG. 5, antenna coupling section 1, radio circuit section 2, flip-lid state detecting circuit 42, flip-lid 41, incoming-call notifying circuit 5, voice control circuit section 6, antenna 9, and antenna extension/contraction state detecting circuit 10 are the same as those in FIG. 1 and FIG. 2, and therefore are represented by the same reference numerals, and descriptions on them are omitted. This telephone apparatus further includes radio control circuit section 3d.

An operation of the portable telephone apparatus having such constitution will be described.

In FIG. 5, antenna 9 is a freely-extensible antenna such as a rod antenna, and antenna extension/contraction state detecting circuit 10 detects an extension state and a contraction state of antenna 9. Antenna extension/contraction state detecting circuit 10 may be a mechanical switch or an optical switch. Radio circuit section 2 demodulates a radio signal from antenna coupling section 1 and modulates a signal to antenna coupling section 1. Radio control circuit section 3d controls radio circuit section 2, decodes and encodes a signal from/to radio circuit section 2, and controls antenna extension/contraction state detecting circuit 10, flip-lid state detecting circuit 42, incoming-call notifying circuit 5, and voice control circuit section 6. Flip-lid state detecting circuit 42 detects whether flip-lid 41 opens or closes. Flip-lid state detecting circuit 42 may be a mechanical switch or an optical switch. Incoming-call notifying circuit 5 notifies an incoming-call to an operator of the portable telephone apparatus. Voice control circuit section 6 reproduces the signal decoded by radio control circuit section 3d as a sound, and supplies a voice signal to be encoded to radio control circuit section 3d with a microphone.

An incoming-call response operation of the telephone apparatus in accordance with preferred embodiment 5 is similar to that described in preferred embodiment 3. The telephone apparatus of preferred embodiment 5 includes freely-openable flip-lid 41, flip-lid state detecting circuit 42, antenna 9, and antenna extension/contraction state detecting circuit 10, changes a responding method for responding to an incoming call when it is determined that flip-lid 41 is opening and antenna 9 is extended. Thus, the operator can change the responding method to a simple method only by opening flip-lid 41 and expanding antenna 9, and can therefore avoid the conventional troublesome incoming call response operation.

What is claimed is:

1. A portable telephone apparatus having a flip-lid and an earphone jack, said portable telephone apparatus comprising:
   a radio circuit section for transmitting and receiving a signal to/from a radio base station;
   a radio control circuit section for controlling said radio circuit section;
   a flip-lid state detecting circuit for detecting an opening/closing state of the flip-lid; and
   a plug detecting circuit for detecting a state of putting a plug into the earphone jack,
   wherein said radio control circuit section changes a responding method for responding to an incoming call when opening the flip-lid and putting the plug are determined based on detection results by said flip-lid state detecting circuit and said plug detecting circuit.

2. A portable telephone apparatus having an extensible antenna that is freely loaded and unloaded in a case and an earphone jack, said portable telephone apparatus comprising:
   a radio circuit section for transmitting or receiving a signal to/from a radio base station;

a radio control circuit section for controlling said radio circuit section;

an antenna state detecting circuit for detecting an extension/contraction state of the antenna; and a plug detecting circuit for detecting a state of putting a plug into the earphone jack, wherein said radio control circuit section changes a responding method for responding to an incoming call when extending the extensible antenna and putting the plug are determined based on detection results by said antenna state detecting circuit and said plug detecting circuit.

3. The portable telephone apparatus according to claim 1 or 2, further comprising a timer used for releasing the changed responding method after a predetermined time.

4. The portable telephone apparatus according to claim 1 or 2, wherein said radio control circuit section changes the responding method for responding to the incoming call from pressing a predetermined specific key to pressing a plurality of predetermined keys.

5. The portable telephone apparatus according to claim 1 or 2, wherein said radio control circuit section changes the responding method for responding to the incoming call from a manual responding method that requires a certain operation to an automatic responding method that requires no operation.

6. A changing method of a responding method of a portable telephone apparatus having a flip-lid and an earphone jack, said changing method comprising the steps of determining an opening/close state of the flip-lid and a state of putting plug into the earphone jack; and changing the responding method for responding to an incoming call in response to the detection of the opening/close state of the flip-lid and the detection of the state of putting the plug into the earphone jack.

7. A changing method of a responding method of a portable telephone apparatus having an extensible antenna that is freely loaded an unloaded in a case and an earphone jack, said changing method comprising the step of:

determining a extension/contraction state of the extensible antenna and a state of putting plug into the earphone jack; and changing the responding method for responding to an incoming call in response to the detection of the extension of extensible antenna and the detection of the state of putting the plug into the earphone jack.

8. A changing method according to claim 6 or 7, further comprising the step of releasing the changed responding method after a set time in a timer.

9. A changing method according to claim 6 or 7, wherein the responding method is changed from pressing a predetermined specific key to pressing a plurality of predetermined keys.

10. A changing method according to claim 6 or 7, wherein the responding method is changed from a manual responding method that requires a certain operation to an automatic responding method that requires no operation.

11. A portable telephone apparatus having a movable-lid, said portable telephone apparatus comprising:

a radio circuit section for transmitting and receiving a signal to/from a radio base station;

a radio control circuit section for controlling said radio circuit section;

a movable-lid state detecting circuit for detecting an opening/closing state of the movable-lid;

a plurality of keys operable to control said radio control circuit section; and a timer operable to start counting a time when said movable-lid state detecting circuit detects that the movable-lid is in an opened state, wherein said radio control circuit section changes a responding method for responding to an incoming call from a responding method that requires pushing of a predetermined key of said plurality of keys to a responding method that requires pushing of any key of said plurality of keys, and wherein, when said timer counts a predetermined time after said movable-lid state detecting circuit detects that the movable-lid is in an opened state, said radio control circuit section changes the responding method for responding to the incoming call from the responding method that requires pushing of any key of said plurality of keys to the responding method that requires pushing of the predetermined key of said plurality of keys.

* * * * *